United States Patent [19]
Gold

[11] 4,253,274
[45] Mar. 3, 1981

[54] PROPAGATING THE PINEAPPLE PLANT

[76] Inventor: Jeffrey E. Gold, 13126 Anza Dr., Saratoga, Calif. 95070

[21] Appl. No.: 90,429

[22] Filed: Nov. 1, 1979

[51] Int. Cl.³ ............................................. A01G 1/00
[52] U.S. Cl. ................................... 47/58; 47/DIG. 3
[58] Field of Search ...................... 47/5.5, 58, DIG. 3

[56] References Cited
U.S. PATENT DOCUMENTS
2,256,254  9/1941  Wendt ..................................... 47/58

*Primary Examiner*—Robert E. Bagwill
*Attorney, Agent, or Firm*—Robert G. Slick

[57] ABSTRACT

Pineapples are propagated by removing a thick rosette of leaves from the top with no flesh attached, peeling off a few of the bottom leaves to expose the stalk and placing the stalk in a rooting medium.

3 Claims, 7 Drawing Figures

PROPAGATING THE PINEAPPLE PLANT

SUMMARY OF THE INVENTION

In the past it has been conventional to propagate plants of the genus Ananas and particularly pineapple plants (*Ananas cosmosus*) by first slicing off the top of a ripe pineapple along with a rosette of leaves including about an inch of the ripe pineapple. The flesh is then cut away leaving the tough tissue center and this is permitted to dry for a few days to form a callus which supposedly will help prevent it from rotting. The cutting is then planted in a moist rooting medium such as one part peat moss and one part sand and kept moist. Normally, such a plant roots in about six weeks. The disadvantage of this prior art method is that it takes about six weeks for the plant to root and there are many failures due to rotting of the stalk.

In accordance with the present invention, an improvement is provided, as is afterwards described in detail, which has a number of advantages over the prior art method. In the first place, it is not necessary to cut through the flesh of the pineapple so that the marketability of the pineapple is not destroyed by taking the cutting. Secondly, in accordance with the present invention, the pineapple roots in two weeks or even less. Additionally, rotting is largely avoided so that the percentage of plants which can be propagated by this method is much higher than the prior art method.

DESCRIPTION OF THE PREFERRED EMBODIMENTS

Figure 1:
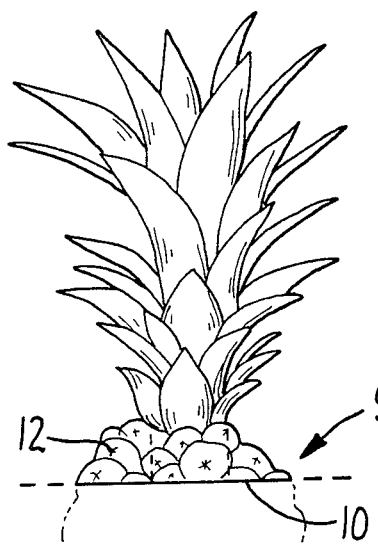
FIG. 1 is a side view of the top of a pineapple showing the first step in propagating the pineapple in accordance with the prior art.
Figure 2:
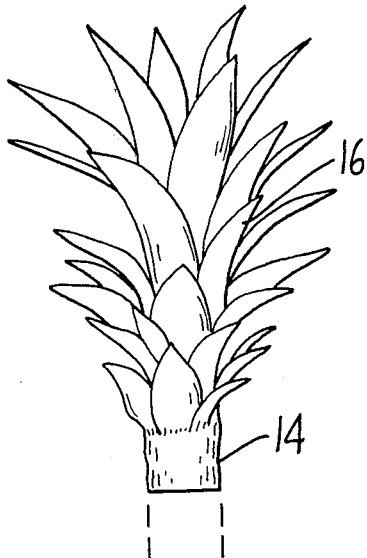
FIG. 2 illustrates the second step of the prior art method of propagating the pineapple.
Figure 3:
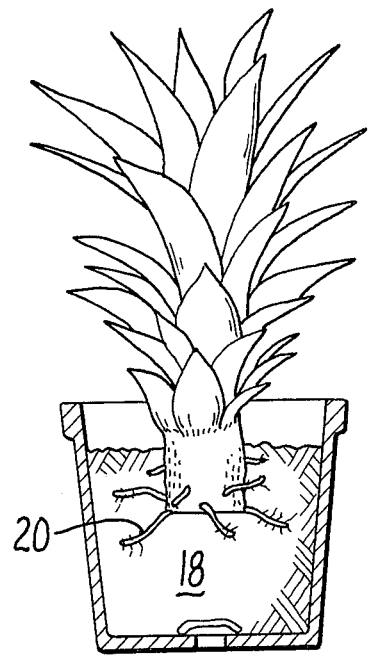
FIG. 3 illustrates the final stage of propagating a pineapple in accordance with the prior art.
Figure 4:
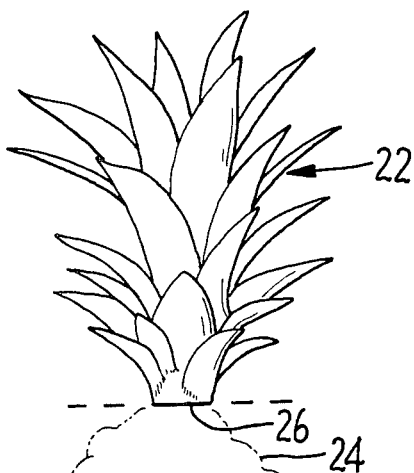
FIG. 4 illustrates the first step in my improved method of propagating a pineapple.
Figure 5:
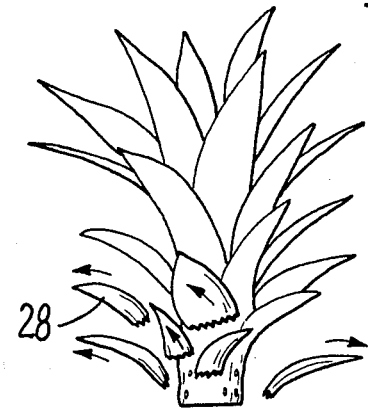
FIG. 5 illustrates the second step in my improved method.
Figure 6:
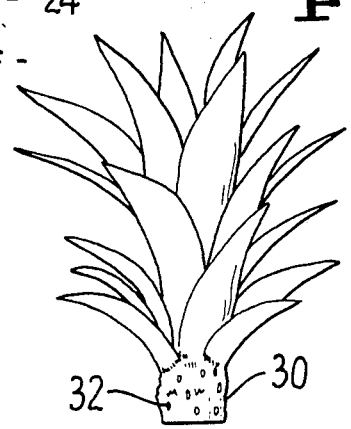
FIG. 6 illustrates a cutting ready for propagation.

Referring now to the drawings by reference characters, and particularly to FIGS. 1-3 which are illustrative of the prior art of pineapple propagation, the pineapple, generally designated 9, is sliced along the line 10 leaving a substantial amount of pineapple flesh 12. Flesh 12 is then cut off leaving the tough, denuded section of stalk 14 which extends upwardly to the leaves 16. The thus prepared cutting is placed in a rooting medium 18 of known composition, such as one part peat moss and one part sand. After about six weeks, roots 20 will form on the cutting. Of course, this illustration of the prior art illustrates a successful rooting and when this method is employed, many of the cuttings fail to root.

Figure 7:
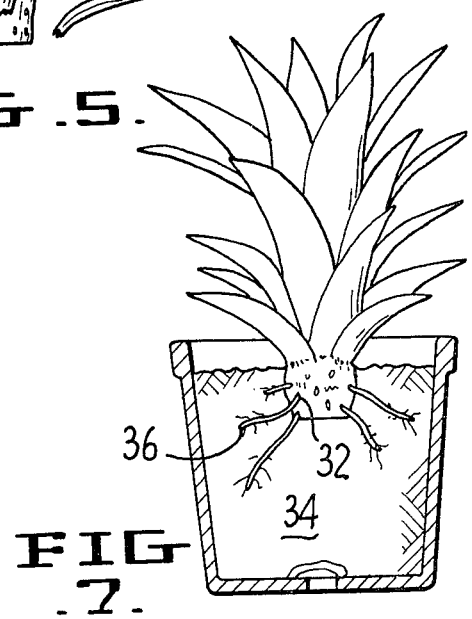
FIG. 7 illustrates the final rooting step in my improved method.

FIGS. 4 through 7 illustrate my new improved method of propagating pineapples. In accordance with this method, a rosette of leaves 22 is cut from the body of the pineapple 24 along the line 26. It will be noted that no flesh has been left on the rosette of leaves. Now, a few of the bottom leaves are peeled off, such as that shown at 28 in FIG. 5. This leaves a stalk 30 about ¾ of an inch long which has a plurality of bumps 32 thereon. As is shown in FIG. 7, the cutting is then placed in a rooting medium 34, which can be the same as rooting medium 18 and the roots 36 about ½ inch long will grow from the bumps 32 in less than two weeks.

It is believed apparent that my improved method is much superior to the prior art method. In the first place, none of the pineapple is wasted; the drying step is eliminated; and the rooting step is much shorter. However, and most important, there is substantially no chance of rotting using my improved method so that almost 100 percent of the cuttings will be usable as pineapple plants.

I claim:

1. The improved method of propagating plants of the genus Ananas by the following steps:
    a. cutting a rosette of leaves from the top of a plant substantially at the junction of the leaves and the flesh, leaving no flesh attached to said rosette;
    b. peeling the bottom leaves from said rosette, leaving an exposed stalk having a plurality of bumps thereon;
    c. inserting said exposed stalk into a moist rooting medium and permitting said cutting to develop roots.

2. The method of claim 1 wherein the leaves are peeled off to the extent that about ¾ of an inch of stalk is exposed.

3. The method of claim 1 wherein the plant is *Ananas cosmosus*.

* * * * *